(12) United States Patent
Rausch et al.

(10) Patent No.: US 9,569,121 B1
(45) Date of Patent: Feb. 14, 2017

(54) HEAT ASSISTED MAGNETIC RECORDING (HAMR) UTILIZATION ANALYSIS AND REPORTING SYSTEM

(71) Applicant: Seagate Technology LLC, Cupertino, CA (US)

(72) Inventors: Tim Rausch, Farmington, MN (US); Douglas Murphy, Hutchinson, MN (US); John W. Dykes, Eden Prairie, MN (US); Jason Zimmerman, Prior Lake, MN (US); James C. Hatfield, Johnstown, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/952,049

(22) Filed: Nov. 25, 2015

(51) Int. Cl.
   G11B 11/00 (2006.01)
   G06F 3/06 (2006.01)
   G11B 7/1387 (2012.01)
   G11B 5/09 (2006.01)
   G11B 5/00 (2006.01)

(52) U.S. Cl.
   CPC .......... *G06F 3/0616* (2013.01); *G06F 3/0653* (2013.01); *G06F 3/0676* (2013.01); *G11B 5/09* (2013.01); *G11B 7/1387* (2013.01); *G11B 2005/0021* (2013.01)

(58) Field of Classification Search
   None
   See application file for complete search history.

(56) References Cited

U.S. PATENT DOCUMENTS

| | | | | |
|---|---|---|---|---|
| 5,585,977 A | * | 12/1996 | Gooch | G11B 5/00856 360/110 |
| 6,320,713 B1 | * | 11/2001 | Tretter | G01R 27/14 360/46 |
| 6,804,085 B1 | * | 10/2004 | Azarian | G11B 5/3106 360/135 |
| 6,895,500 B1 | | 5/2005 | Rothberg | |
| 7,382,566 B2 | | 6/2008 | Shimotono et al. | |
| 7,802,019 B2 | | 9/2010 | Shu et al. | |
| 8,264,920 B1 | * | 9/2012 | Chou | B82Y 20/00 369/112.09 |
| 8,670,215 B2 | | 3/2014 | Zou et al. | |
| 8,854,929 B1 | | 10/2014 | Champion et al. | |
| 8,891,341 B1 | | 11/2014 | Krichevsky et al. | |
| 9,106,099 B2 | | 8/2015 | Gelonese | |
| 2006/0103960 A1 | * | 5/2006 | Imamura | G11B 5/455 360/31 |
| 2013/0083636 A1 | * | 4/2013 | Kotani | G11B 5/314 369/13.14 |

(Continued)

*Primary Examiner* — Peter Vincent Agustin
(74) *Attorney, Agent, or Firm* — Hall Estill Attorneys at Law

(57) ABSTRACT

Method and apparatus for managing a data storage system that utilizes heat assisted magnetic recording (HAMR). In some embodiments, the method includes recording data to a storage medium using the HAMR system, accumulating a usage statistic indicative of actual elapsed operation of the HAMR system, and setting an indication value in a memory indicative of an estimate of remaining available elapsed operation of the HAMR system. The estimate of remaining available elapsed operation is determined in relation to the usage statistic and an estimated total elapsed operation value.

20 Claims, 3 Drawing Sheets

(56) References Cited

U.S. PATENT DOCUMENTS

| | | | |
|---|---|---|---|
| 2013/0128371 A1* | 5/2013 | Brong | G11B 5/455 |
| | | | 360/31 |
| 2013/0286799 A1 | 10/2013 | Zhu et al. | |
| 2015/0003219 A1* | 1/2015 | Isokawa | G11B 5/314 |
| | | | 369/13.17 |
| 2015/0036469 A1 | 2/2015 | Johnson et al. | |
| 2015/0131416 A1* | 5/2015 | Huang | G11B 7/1387 |
| | | | 369/13.33 |
| 2016/0055881 A1* | 2/2016 | Cordle | G11B 20/10388 |
| | | | 369/13.27 |

\* cited by examiner

HEAT ASSISTED MAGNETIC RECORDING (HAMR) UTILIZATION ANALYSIS AND REPORTING SYSTEM

SUMMARY

Various embodiments of the present disclosure are generally directed to a method and apparatus for managing a data storage system that utilizes heat assisted magnetic recording (HAMR).

In some embodiments, the method includes recording data to a storage medium using the HAMR system, accumulating a usage statistic indicative of actual elapsed operation of the HAMR system, and setting an indication value in a memory indicative of an estimate of remaining available elapsed operation of the HAMR system. The estimate of remaining available elapsed operation is determined in relation to the usage statistic and an estimated total elapsed operation value.

In further embodiments, the apparatus has a data transducer configured to be supported adjacent a storage medium to write data thereto, the data transducer comprising a write element and a heat assisted magnetic recording (HAMR) system. A control circuit is configured to accumulate a usage statistic indicative of actual elapsed operation of the HAMR system, and to set an indication value in a memory indicative of an estimate of remaining available elapsed operation of the HAMR system in relation to the usage statistic and an estimated total elapsed operation value.

In further embodiments, a data storage device has a rotatable data recording medium, and a data transducer positionably adjacent the data recording medium. The transducer has a write element, a read sensor, and a heat assisted magnetic recording (HAMR) system comprising a laser diode and a near field transducer. A laser driver circuit is configured to apply power to the laser diode during an enabled mode of the HAMR system. A control circuit is configured to accumulate a usage statistic indicative of actual elapsed operation of the HAMR system in the enabled mode, and to set an indication value in a memory indicative of an estimate of remaining available elapsed operation of the HAMR system in relation to the usage statistic and an estimated total elapsed operation value.

DETAILED DESCRIPTION

Figure 1:
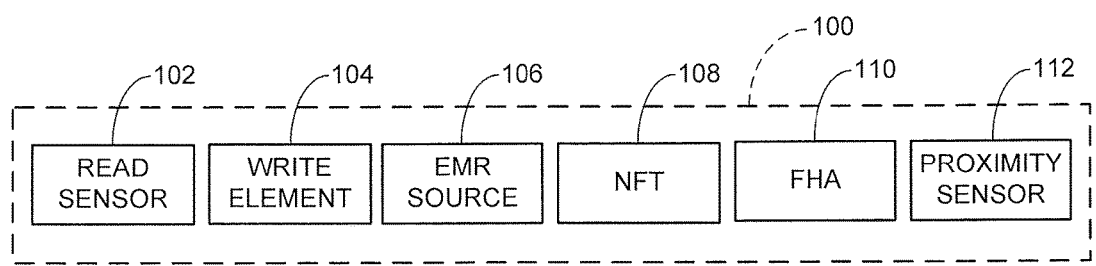
FIG. 1 is a functional block diagram of a data transducer that employs heat assisted magnetic recording (HAMR) techniques in accordance with some embodiments.

The present disclosure is generally directed to data storage systems, and more particularly to analyzing and communicating reliability status information to a host device regarding the operation of a heat assisted magnetic recording (HAMR) system.

Data storage devices store and retrieve data in a fast and efficient manner. Some data storage devices employ rotatable magnetic recording media (discs) which are rotated at a high rotational velocity. An array of data transducers (heads) are movably positioned adjacent tracks defined on the disc surfaces to write and read data.

Heat assisted magnetic recording (HAMR) generally refers to the use of electromagnetic energy to assist in the magnetic recording of data. A HAMR system generally includes a source of electromagnetic radiation (EMR), such as but not limited to a laser diode. The source may be used to locally heat the magnetic recording medium to a temperature near or above the Curie temperature of the magnetic material. In this way, the magnetic coercivity of the material can be significantly lowered during a write operation, allowing a magnetic field from a magnetic write element to write a desired magnetization pattern to the media. HAMR systems can take any number of forms including microwave assisted magnetic recording (MAMR) systems, etc.

Some HAMR systems utilize a near field transducer (NFT) to assist in the focusing of the electromagnetic energy onto the magnetic recording media. It has been found that a common failure mode experienced by some HAMR designs relates to the NFT. Generally, it has been determined that NFTs tend to wear out, as a general rule, faster than other elements in the system. Empirical evidence suggests that NFTs follow the well known reliability bath-tub curve; many initial failures (largely screened during manufacturing), a relatively long stable period of random failures, followed by a sharp increase in end of life failures.

The inventors of the present disclosure have determined that NFT failures are often a function of total operational hours and laser power. On the one hand, NFTs seem to experience a wear out function based on total accumulated hours of use. On the other hand, the laser power focused by the NFT seems to be an accelerating factor. For example, operating an NFT at a relatively higher laser power may tend to greatly accelerate the wear out of the NFT. This is believed to be correlated to the larger temperatures experienced by higher laser power, although temperature of the NFT or at a position adjacent the NFT can be a separate factor in addition to laser power.

Accordingly, various embodiments of the present disclosure are generally directed to a monitoring and reporting system to provide usage information to a customer (e.g., host device) regarding the remaining expected life of a HAMR system. A number of alternatives are contemplated and discussed below in turn.

In some embodiments, a data storage device employing one or more HAMR systems includes an analysis circuit that operates to accumulate total elapsed time (e.g., accumulated hours) of operation of the NFTs in the system. In some cases, data transfers involve cylindrical writes in which writes are distributed to nominally axially aligned tracks at a given radius on the media stack (e.g., a "cylinder"). The storage device largely distributes write data to all head/surface combinations in a substantially uniform fashion. In such case, a counter (timer) circuit accumulates the total time during which writes take place, either on a write gate or a laser (or other EMR driver) enable signal basis. This total accumulated time can be divided by the total number of heads in the system, thereby providing an estimated number of operational hours for each head. This is similar to hour tracking type odometers used on various types of commercial equipment (tractors, forklifts, etc.).

In an alternative embodiment, usage by each head can be tracked individually. This can be used to accommodate different schemes if the user, for example, prefers to write data extensively to one particular head/disc combination.

Another embodiment provides the elapsed operational time based on write location. Generally, laser power is usually set on a per zone basis due to the differences in write frequency for the respective zones. Higher laser power levels are often used toward the outermost diameter (OD) of the media, and lower laser power levels are often used toward the innermost diameter (ID) of the media. These values can be weighted so that, for example, writes toward the OD are counted faster toward the overall elapsed time count and writes toward the ID are counted slower toward the overall elapsed time count.

In yet another embodiment, the usage statistics are not measured in terms of operational time, but instead in terms of the accumulated total energy that has been passed through the NFTs. Again, this can be done on an individual basis or on an overall average basis. In one approach, the total number of joules applied to the NFT (or other HAMR system component) is measured, calculated or otherwise determined. In some cases, an energy level less than a threshold may be found to not contribute to significant life degradation of the NFT, whereas energy levels at or above the threshold do significantly contribute to degradation. Accordingly, in further embodiments, only hours or joules at levels that cause accelerated wear are accumulated and reported. Other embodiments incorporate other sensor measurements such as voltage levels, temperature measurements, etc.

The accumulated metrics can be reported to the host device in a variety of ways, including an odometer type reading where the total number of operational hours, joules, etc. that have been utilized is reported. Alternatively, a countdown type metric can be used similar to a fuel tank gauge so that remaining operational life is counted down to a minimum level in a suitable fashion. While random failures of individual devices cannot usually be reliably predicted, overall trends can be monitored based on empirical measurements to provide accurate estimates of when failures are likely to occur. This can provide the user of a host system with advance notice of potential failure conditions, enabling appropriate corrective actions to be taken such as modification of an operational state of an existing device, replacement of a device with a new device, etc.

These and other features and aspects of various embodiments of the present disclosure can be understood beginning with a review of FIG. 1 which provides a functional block diagram for a data transducer 100 that employs heat assisted magnetic recording (HAMR) techniques in a data storage system. As noted above, the term HAMR will be understood broadly as any thermal or energy based assisted recording mechanism that facilitates the writing of data to a data recording medium by a separate write element.

As depicted in FIG. 1, the transducer (head) 100 includes a number of operational elements, including a read sensor 102, a write element 104, an electromagnetic radiation (EMR) source 106, a near field transducer (NFT) 108, a fly height adjustment (FHA) mechanism 110 and a proximity sensor 112. These elements may be incorporated in or on a slider (not separately designated) having an air bearing surface (ABS) configured to maintain the transducer at a stable fly height above (clearance distance from) a recording surface of an adjacent magnetic recording medium (not separately shown in FIG. 1).

It will be appreciated that FIG. 1 is merely exemplary and any number of variations can be employed as required, including configurations with multiple read sensors, multiple write elements, various types of EMR sources with or without the use of an NFT, etc. Other elements can be incorporated into the transducer 100 such as microactuators, contact detect sensors, laser power detectors, etc.

Without limitation, the read sensor 102 may take a magnetoresistive (MR) construction and operates to provide a variable electrical resistance in the presence or absence of a magnetic field. In this way, the sensor 102 can be used to transduce a previously written magnetic pattern to an associated magnetic recording medium. The write element 104 may be a perpendicular magnetic recording element with a coil and pole configuration to direct concentrated magnetic flux into the recording layer of the medium.

The EMR source 106 may take the form of a laser diode that applies collated light energy at a selected wavelength to provide localized heating of the media recording layer. The light may be transferred by a waveguide or other light conducting channel. The NFT 108 may take the form of a semiconductor based element that can be used to focus the light from the EMR source (e.g., laser diode) onto the medium.

The FHA mechanism 110 may take the form of a heater which reduces the effective fly height of the transducer 100 with respect to the medium through thermal expansion of the slider body. The sensor 112 may detect proximity and/or contact between the slider body and the associated media surface.

Figure 2:
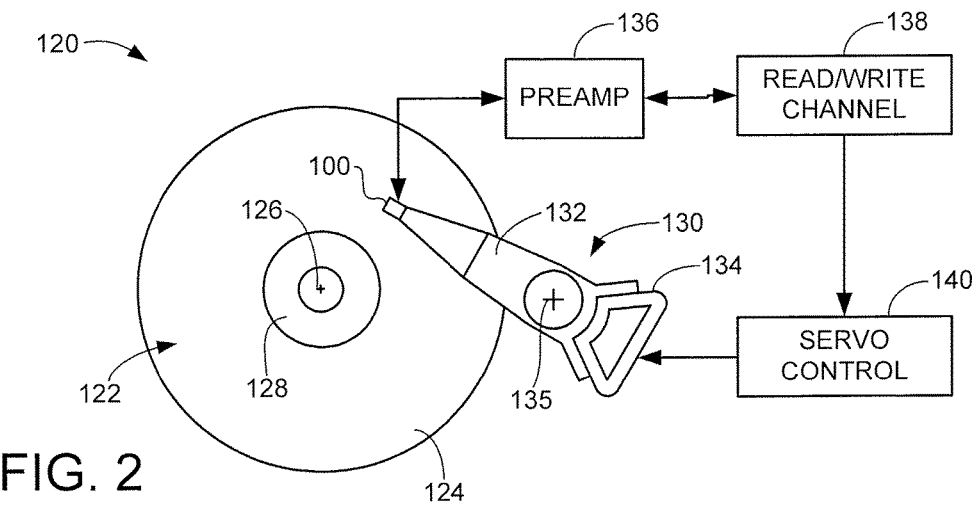
FIG. 2 is a schematic representation of a data storage device that incorporates the data transducer from FIG. 1.

FIG. 2 shows a schematic representation of aspects of a data storage device 120 in which one or more transducers such as 100 in FIG. 1 can be implemented. The device 120 is characterized as a hard disc drive (HDD), although other configurations can be used.

The device 120 includes a media stack 122 made up of one or more rotatable magnetic recording media (discs) 124 that are axially aligned for rotation about a central rotational axis 126 by a spindle motor hub assembly 128. A rotary actuator 130 is mounted adjacent the media (disc) stack 122 and includes one or more actuator arms 132 that extend to support the transducers 100 adjacent the surfaces of the discs 124. A coil 134 of a voice coil motor, VCM (not separately shown) facilitates rotary movement of the actuator 130 about a pivot point 135 to controllably advance the heads 100 across the media surfaces.

A preamplifier/driver circuit (preamp) 136 provides control signals utilized by the various operative elements shown in FIG. 1, including read sensor current drivers and preamplification circuitry, write drivers, laser diode drivers, FHA drivers, proximity sensor drivers, etc. The preamp 136 may further include multiplexor (mux) selection logic to enable the individual selection of the various heads 100 as required.

A read/write (R/W) channel 138 provides signal conditioning of input write data during a write operation and readback signal processing of readback signals during a read operation. A servo control circuit 140 receives demodulated servo information written to the various tracks on the media surfaces to enable closed loop positional control of the respective heads 100.

Figure 3:
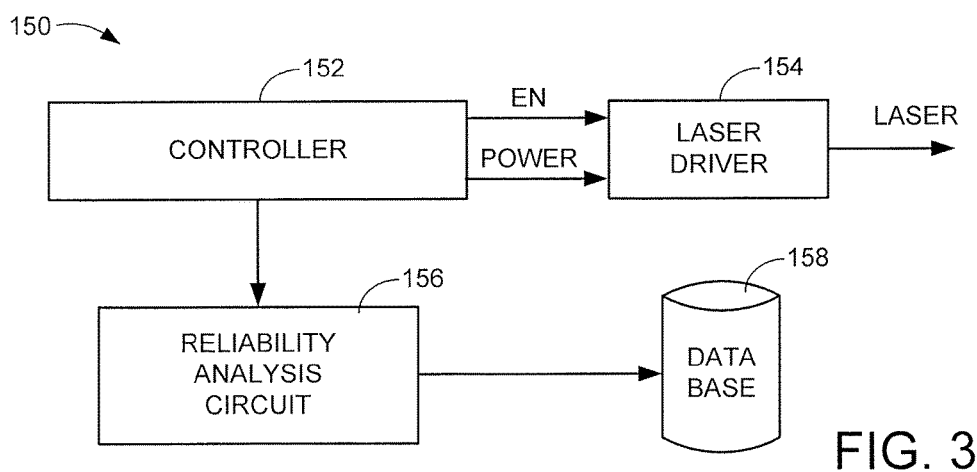
FIG. 3 is a functional block diagram of a control circuit of the data storage device of FIG. 2 in some embodiments.

FIG. 3 is a functional block diagram of a control circuit 150 of the data storage device 120 of FIG. 2 in accordance with some embodiments. As explained below, the control circuit 150 monitors and reports reliability information regarding the various transducers 100. A controller 152 may take the form of a hardware circuit or a programmable processor that utilizes programming stored in an associated memory device. The controller 152 provides a number of control operations for the device, including supplying laser driver enable and power setting values for a laser driver 154. The laser driver 154 may be incorporated into the preamp 136. Separate laser driver circuits may be supplied for each transducer, or switching circuitry (not shown) may be used to direct the output of the laser driver 154 to the appropriate laser diode.

A reliability analysis circuit 156 operates in conjunction with a data structure (data base) in a memory 158 to accumulate, analyze and report usage statistics regarding the operation of the HAMR system(s) of the data storage device. As with the controller 152, the reliability analysis circuit may take the form of a hardware or programmable processor circuit.

Figure 4:
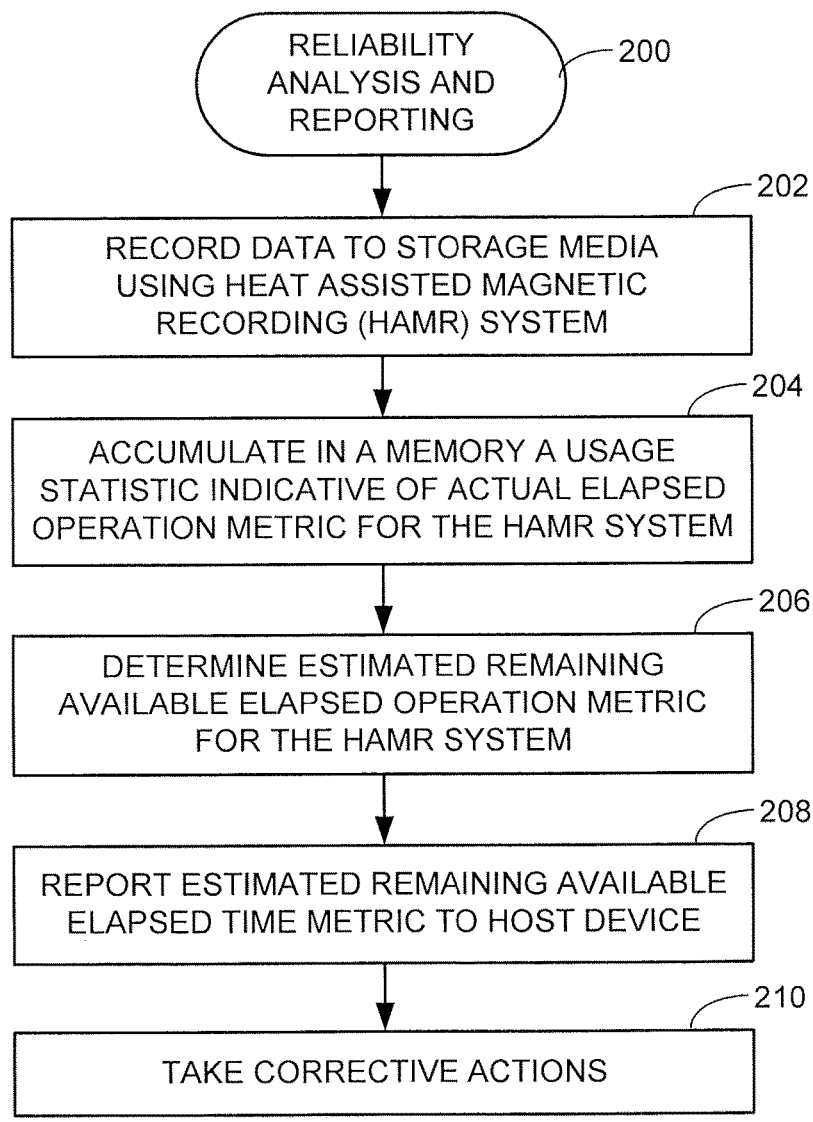
FIG. 4 is a flow chart for a reliability analysis and reporting routine carried out in accordance with various embodiments of the present disclosure.

FIG. 4 is a flow chart for a reliability analysis and reporting routine 200 to illustrate steps carried out by the control circuit 150 of FIG. 3 in accordance with various embodiments. The steps in FIG. 4 are merely exemplary and may be modified, appended, performed in a different order, etc. as required.

Data are initially recorded to a set of storage media using a HAMR system at step 202. For purposes of the present discussion, the HAMR system will be viewed as including the EMR source 106 and the NFT 108, with the EMR source taking the form of a laser diode. Such is merely exemplary and is not limiting.

Usage statistics are accumulated in a memory at step 204 with regard to the operation of the HAMR system. The usage statistics generally indicate an actual elapsed operation metric for the HAMR system, such as in the form of elapsed time (e.g., operational hours, etc.) or accumulated expended energy. Other metric formats can be used.

An estimated remaining available elapsed operation metric is next determined at step 206 for the HAMR system. As explained below, this may be based on an estimated overall life value from which the usage statistics from step 204 are subtracted.

The available elapsed time metric from step 208 is reported to a host device at step 208, and as required, the host device, either directly or through the intervention of a user, performs one or more corrective actions at step 210.

Figure 5:
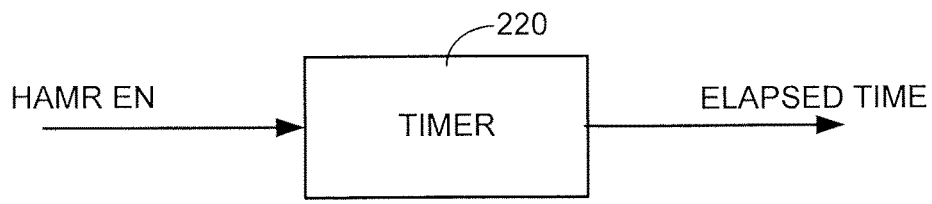
FIG. 5 shows a timer circuit that may be employed by the data storage device of FIG. 2 during the execution of the routine of FIG. 4 in some embodiments.

A first embodiment for the control circuit 150 is generally represented in FIG. 5. A timer circuit 220 is incorporated into the reliability analysis circuit 156 and is adapted to accumulate an elapsed time metric based on a total amount of time that the HAMR system has been enabled. This may be triggered by sensing a HAMR EN signal or via some other suitable mechanism. In some cases, the elapsed time may be expressed in total hours.

This provides a relatively simple "odometer" type metric that tracks the laser (or writer) power on hours (wPOH) for each head in the storage device. The value wPOH is simply the total time that the laser is on and at writing power for a given head. This value may already be tracked in some SMART (self-monitoring analysis reliability tracking) systems of modern storage devices. Use of a serpentine data write architecture distributes the workload evenly across all the heads in the device, so it can be expected that the total wPOH on each head to be roughly the same. Therefore, $$wPOH_{Drive} = \Sigma_{heads} wPOH_{head} = \#_{heads} \text{heads} \times wPOH_{head} \quad (1)$$

However, this may not always be true and it is possible that some end user applications can direct a significant portion of the data transfer workload to a single head/media combination. In this latter case, the wPOH of the device can be determined as the summation of the wPOH for each head.

$$wPOH_{Drive} = \Sigma_{heads} wPOH_{head} \quad (2)$$

Equation (2) is a simple and straightforward definition of wPOH that can be used as an odometer in the device. As desired, empirical analysis including failure report data from other similar devices can enable generation of the overall operational life value as an estimate of total estimated life that the HAMR systems will last. The difference between the accumulated usage statistic (operational hours) and the estimated life can be reported to the user as estimated remaining life per the routine of FIG. 4.

It will be noted that equation (2) only tracks how many hours the NFT spends writing and does not capture other factors, such as the changes in NFT temperature which may also contribute to NFT failure.

For the present example, the host device could simply query the number of hours the device has spent writing. Depending on the failure mode (wear out or random) a user of the host device may decide to pull the drive after a certain wPOH target has been exceeded. The user may also choose to read this metric from numerous concurrently operated devices and evaluate the failure rate as a function of wPOH. If the failure rate is acceptable, the user may elect to keep the population of devices in an operational state. The use of "hours" is a convenient unit of measurement but is not limiting.

Figure 6:
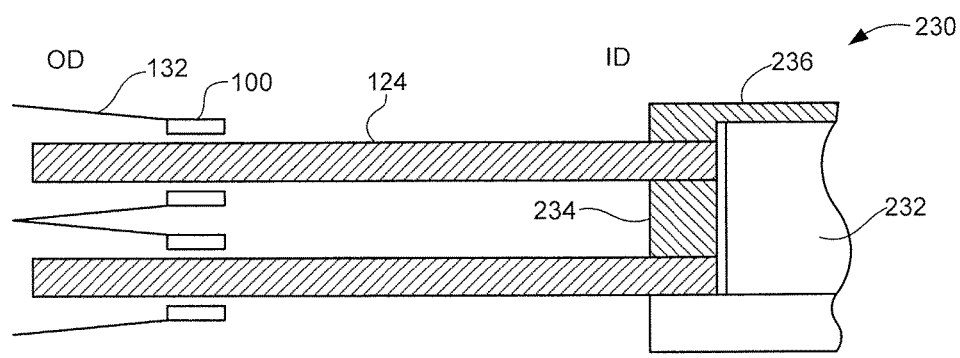
FIG. 6 is a side elevational cross-sectional representation of a disc stack of the data storage device in accordance with some embodiments.

FIG. 6 is a side elevational representation of the media stack 122 of FIG. 2 in some embodiments. A total of two (2) storage discs 124 are axially aligned and mounted to a rotatable spindle motor hub 232. The discs 124 are spaced using an intervening disc spacer 234 and clamped to the spindle motor hub 232 using a clamp member 238. FIG. 6 shows a total of four (4) data transducers 100, one supported adjacent each associated data recording surface. Each transducer 100 includes a HAMR system (e.g., laser diode, NFT, etc.).

As noted above, NFT failure rates are influenced at least in part by the amount of time the NFT spends writing and the temperature of the NFT during writing. It is common in a HAMR system to change the laser power across the stroke of the actuator 130 (FIG. 2), so that different power values are used from the outermost diameter (OD) to the innermost diameter (ID) of the discs. Generally, some HAMR systems operate such that at the OD of the discs 124 the laser power is higher than at the ID of the discs 124. This change in laser power arises based on a number of factors, including the fact that in constant linear velocity (CLV) recording systems where the discs 124 are rotated at a constant velocity, generally higher data recording frequencies will be used at the OD as compared to the ID.

Accordingly, another embodiment normalizes the operational hours in relation to the radial location of the transducer with respect to the medium. A first scaling factor, such as 1.0, may be used for intermediate tracks, a second scaling factor such as 0.8 may be used for tracks near the ID, and a third scaling factor such as 1.2 may be used for tracks near the OD. More generally, a variable scaling factor $S(x)$ that varies with respect to radius $(x)$ may be used as follows to provide a normalized wPOH (operational hours) value:

$$\text{Normalized wPOH} = (\text{Actual wPOH})S(x) \quad (3)$$

Since the temperature of the NFT depends on laser power, when the head writes at the OD it is hotter than when it writes at the ID. In other words, one hour of writing at the OD will tend to degrade the NFT more than one hour of writing at the ID. In effect, it is the total joule heating of the NFT that matters. The joule heating of the NFT can be defined as:

$$\text{joule Heating} = \text{Laser Power(mA)} \times \text{wPOH} \quad (4)$$

There are a number of ways in which joule heating can be tracked, including on a per track, per sector or per wedge basis. Regardless, a joule heating counter can be established in the device 100, such as the monitor circuit 240 shown in FIG. 7. This circuit can maintain total joule heating in the device 100 as the sum of the joule heating for an individual head, as follows:

$$\text{joule Heat}_{Drive} = \Sigma_{heads} \text{Joule Heating}_{head} \quad (5)$$

In this embodiment, the figure of merit for the output reporting meter (e.g., odometer) is joule heating instead of wPOH. This would capture the impact on NFT life by writing across the stroke of the discs 124. Based on empirical analysis a total joule heating target can be defined that indicates overall life, as before.

It has been found that failure characteristics of NFTs are not necessarily linear with joule heating since different energy barriers are involved when the NFT fails. For example, there may be a failure mode that exists only when the laser power is greater than 20 mA. If the laser power is maintained at a level below 20 mA, this failure mode is largely absent. Thus, if the laser power across the stoke of the actuator 130 increases from around 18 mA at the ID to around 22 mA at the OD, this failure mode would only be expressed for the relatively higher laser power values. In such case, the accumulated usage statistic would not include elapsed operation of the HAMR system for applied power values below a predetermined threshold, such as, for example, 20 mA.

Figure 7:
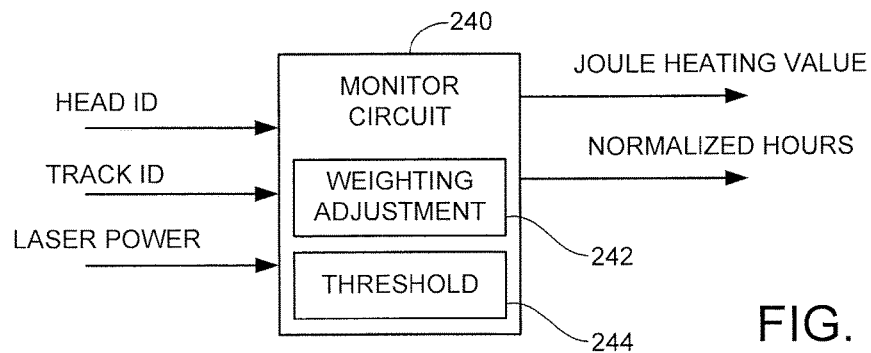
FIG. 7 is a functional block representation of a monitor circuit that may be utilized by the data storage device of FIG. 2 during the execution of the routine of FIG. 4 in further embodiments.

Accordingly, FIG. 7 shows the monitor circuit 240 to include a weighting adjustment block 242 and a threshold block 244. The weighting adjustment block 242 could operate, for example, to provide different scalar values for writes at different radial locations (track IDs) and/or different laser power values. The output could be provided in terms of either accumulated joule heating, normalized operational hours, or both as desired. As required, the threshold block 244 could signify an associated end of life value or remaining operational life value, also in joules or hours (or both).

If hours is the preferred figure of merit, the joule heating counter can be converted to hours, such as by normalizing the total amount as equivalent hours spent writing at the OD, which would be a worst case scenario. In this case, the user would see effective wPOH where all writing is normalized to writing at the OD. Other normalization schemes can be used to provide more accurate measurements.

Figure 8:
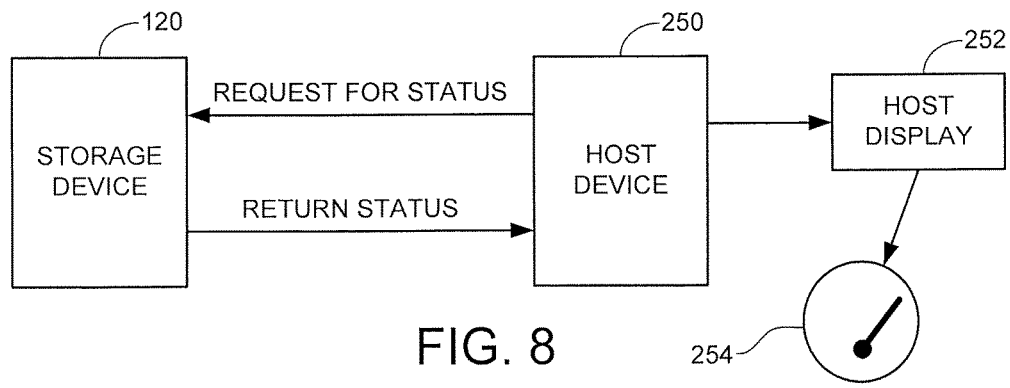
FIG. 8 shows the data storage device in conjunction with a host device.

FIG. 8 shows the storage device 120 in communication with a host device 250. As discussed above, the host device can take any suitable form including but not limited to a local or remote client computer or other device with a processor. In some embodiments, the host device can be configured to issue a request for status information to the storage device 120. In response, the storage device 120 provides a return status, which may include the operational life values discussed above. Other status information regarding the operation of the device may be transmitted to the host device as well. This information may be displayed on a host display 252, which may take the form of a CRT, flat screen monitor, touch screen, etc. The estimated remaining life metric can be displayed in any suitable form on the display including in a graphical form such as represented at 254 (fuel gage type display). Other forms can be used, such as an odometer type graphical form that increments up or down.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    recording data to a storage medium using a heat assisted magnetic recording (HAMR) system;
    accumulating a usage statistic indicative of actual elapsed operation of the HAMR system, the usage statistic normalized in relation to a power value applied to an electromagnetic radiation (EMR) source of the HAMR system; and
    setting an indication value in a memory indicative of an estimate of remaining available elapsed operation of me HAMR system in relation to the usage statistic and an estimated total elapsed operation value.

2. The method of claim 1, wherein the HAMR system comprises a laser diode and a near field transducer (NFT) which cooperate to irradiate a localized region of the storage medium with electromagnetic radiation as a magnetic write element applies a magnetic write field to the localized region to record the data thereto.

3. The method of claim 1, wherein the usage statistic is further expressed in terms of total accumulated hours of operation of the HAMR system.

4. The method of claim 1, wherein the usage statistic is further expressed in terms of total accumulated joules heating of the HAMR system.

5. The method of claim 1, wherein the storage medium is a magnetic recording disc and the HAMR system includes a laser diode which irradiates the magnetic recording disc with electromagnetic energy during a write operation.

6. The method of claim 5, wherein the usage statistic does not include elapsed operation of the HAMR system for applied power values below a predetermined threshold.

7. The method of claim 1, wherein the usage statistic is further expressed in terms of operational hours which are scaled in relation to a variable scale factor that varies with respect to position on the storage medium.

8. The method of claim 7, wherein the variable scale factor has a lowest value near an innermost diameter (ID) of the storage medium and has a highest value near an outermost diameter (OD) of the storage medium.

9. The method of claim 1, further comprising displaying on a display device information that indicates the estimate of remaining available elapsed operation of the HAMR system in a graphical form.

10. The method of claim 1, wherein the recording step comprises recording data to a plurality of storage media using a corresponding plurality of HAMR systems, and wherein the usage statistic is determined in relation to an overall accumulated usage of all of the plurality of HAMR systems.

11. An apparatus comprising:
- a data transducer configured to be supported adjacent a storage medium to write data thereto, the data transducer comprising a write element and a heat assisted magnetic recording (HAMR) system; and
- a control circuit configured to accumulate a usage statistic indicative of actual elapsed operation of the HAMR system in terms of total accumulated joules heating of the HAMR system, and to set an indication value in a memory indicative of an estimate of remaining available elapsed operation of the HAMR system in relation to the usage statistic and an estimated total elapsed operation value.

12. The apparatus of claim 11, wherein the HAMR system comprises a laser diode and a near field transducer (NFT) which cooperate to irradiate a localized region of the storage medium with electromagnetic radiation as the magnetic write element applies a magnetic write field to the localized region to record the data thereto.

13. The apparatus of claim 11, wherein the storage medium is characterized as a rotatable magnetic recording medium.

14. The apparatus of claim 11, wherein the HAMR system comprises a laser diode and a near field transducer to focus electromagnetic energy onto the storage medium.

15. The apparatus of claim 11, wherein the usage statistic is normalized in relation to a power value applied to an electromagnetic radiation (EMR) source of the HAMR system.

16. The apparatus of claim 15, wherein the usage statistic does not include elapsed operation of the HAMR system for applied power values below a predetermined threshold.

17. The apparatus of claim 11, wherein the usage statistic is expressed in terms of operational hours which are scaled in relation to a variable scale factor that varies with respect to position on the storage medium, the variable scale factor having a lowest value near an innermost diameter (ID) of the storage medium and a highest value near an outermost diameter (OD) of the storage medium.

18. A data storage device comprising:
- a rotatable data recording medium;
- a data transducer positionably adjacent the data recording medium and comprising a write element, a read sensor, and a heat assisted magnetic recording (HAMR) system comprising a laser diode and a near field transducer;
- a laser driver circuit configured to apply power to the laser diode during an enabled mode of the HAMR system;
- a control circuit configured to accumulate a usage statistic indicative of actual elapsed operation of the HAMR system in the enabled mode, and to set an indication value in a memory indicative of an estimate of remaining available elapsed operation of the HAMR system in relation to the usage statistic and an estimated total elapsed operation value, the usage statistic expressed in terms of operational hours which are scaled in relation to a variable scale factor that varies with respect to position on the storage medium.

19. The data storage device of claim 18, wherein the control circuit comprises a programmable processor that uses programming stored in an associated memory to generate the usage statistic and the estimated total elapsed operation value.

20. The data storage device of claim 18, wherein the usage statistic does not include elapsed operation of the HAMR system for applied power values below a predetermined threshold.

* * * * *